US008187146B2

(12) United States Patent
Allgaier et al.

(10) Patent No.: US 8,187,146 B2
(45) Date of Patent: May 29, 2012

(54) METHOD TO CONTROL A HYBRID DRIVE TRAIN

(75) Inventors: Bernd Allgaier, Kressbronn (DE); Friedrich Tenbrock, Langenargen (DE); Thomas Lemp, Langenargen (DE); Michael Gromus, Erskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 505 days.

(21) Appl. No.: 12/477,212

(22) Filed: Jun. 3, 2009

(65) Prior Publication Data

US 2009/0312144 A1 Dec. 17, 2009

(30) Foreign Application Priority Data

Jun. 12, 2008 (DE) .......................... 10 2008 002 383

(51) Int. Cl.
*B60W 10/02* (2006.01)
(52) U.S. Cl. ............................ 477/5; 701/22; 180/65.28
(58) Field of Classification Search .................. 477/2, 5, 477/6, 176, 180, 181; 180/65.21, 65.265, 180/65.25, 65.26, 65.27, 65.28, 65.285; 903/903, 903/913, 914, 915, 918; 701/67, 68
See application file for complete search history.

(56) References Cited

U.S. PATENT DOCUMENTS

| 5,713,814 | A | * | 2/1998 | Hara et al. ........................ 477/5 |
| 5,846,155 | A | * | 12/1998 | Taniguchi et al. ................. 477/2 |
| 5,903,061 | A | * | 5/1999 | Tsuzuki et al. ............. 290/40 C |
| 6,570,265 | B1 | * | 5/2003 | Shiraishi et al. ............ 290/40 C |
| 6,746,366 | B2 | | 6/2004 | Tamor |
| 7,244,208 | B2 | | 7/2007 | Bauknecht et al. |
| 7,749,132 | B2 | * | 7/2010 | Motosugi et al. ................. 477/5 |
| 7,770,676 | B2 | * | 8/2010 | Tenbrock et al. ........ 180/65.285 |
| 7,874,956 | B2 | * | 1/2011 | Kouno ............................... 477/5 |
| 8,062,173 | B2 | * | 11/2011 | Allgaier et al. ..................... 477/5 |
| 2003/0125162 | A1 | * | 7/2003 | Senger et al. ................. 477/181 |
| 2007/0028718 | A1 | * | 2/2007 | Lee et al. ......................... 74/661 |
| 2007/0125083 | A1 | * | 6/2007 | Rollinger et al. ............ 60/605.1 |
| 2007/0275818 | A1 | * | 11/2007 | Kouno ............................... 477/3 |
| 2007/0275823 | A1 | * | 11/2007 | Motosugi et al. ............ 477/176 |
| 2007/0287564 | A1 | * | 12/2007 | Cho et al. .......................... 475/5 |
| 2008/0039261 | A1 | * | 2/2008 | Cho et al. .......................... 475/5 |
| 2008/0064561 | A1 | * | 3/2008 | Popp et al. ......................... 477/5 |
| 2008/0196954 | A1 | * | 8/2008 | Soliman et al. ............. 180/65.2 |
| 2008/0293538 | A1 | * | 11/2008 | Saito et al. ........................ 477/3 |
| 2009/0055060 | A1 | * | 2/2009 | Minami ........................... 701/54 |

(Continued)

FOREIGN PATENT DOCUMENTS

DE 43 24 010 A1 1/1995

(Continued)

*Primary Examiner* — John R Olszewski
*Assistant Examiner* — Brodie Follman
(74) *Attorney, Agent, or Firm* — Davis & Bujold, P.L.L.C.

(57) ABSTRACT

A method of controlling a hybrid drive train of a vehicle which comprises, in series, an internal combustion engine, a clutch, an electric motor and a transmission with an output connected to the drive axle. During traction operation, the vehicle changes from an electric driving mode into a combination driving mode or a combustion engine driving mode, in that the clutch is engaged and the electric torque is temporarily increased. The method includes regulating engagement of the clutch at least until reaching a starting rotational speed of the combustion engine such that the acceleration of the combustion engine occurs according to a predetermined progression of rotational speed and that the torque of the combustion engine is increased by the same amount as the transferable torque of the clutch is increased by the engagement process.

18 Claims, 3 Drawing Sheets

U.S. PATENT DOCUMENTS

| | | | |
|---|---|---|---|
| 2009/0312143 A1* | 12/2009 | Allgaier et al. | 477/5 |
| 2009/0312144 A1* | 12/2009 | Allgaier et al. | 477/5 |
| 2010/0019709 A1* | 1/2010 | Le Neindre et al. | 318/400.23 |
| 2010/0023231 A1* | 1/2010 | Allgaier et al. | 701/51 |
| 2010/0204862 A1* | 8/2010 | Uejima et al. | 701/22 |
| 2010/0327794 A1* | 12/2010 | Ohshima | 318/503 |

FOREIGN PATENT DOCUMENTS

| | | |
|---|---|---|
| DE | 100 12 221 A1 | 10/2001 |
| DE | 101 50 990 A1 | 5/2002 |
| DE | 102 60 435 A1 | 7/2004 |
| DE | 103 46 640 A1 | 5/2005 |
| DE | 10 2005 007 966 A1 | 10/2006 |

* cited by examiner

METHOD TO CONTROL A HYBRID DRIVE TRAIN

This application claims priority from German patent application serial no. 10 2008 002 383.3 filed Jun. 12, 2008.

FIELD OF THE INVENTION

The invention relates to a method of controlling a hybrid drive train of a motor vehicle which is designed with serial arrangement of the internal combustion engine, a clutch, an electric motor operating as engine and generator, and a drive transmission having an output drive connection to the drive axle of the motor vehicle, wherein during thrust operation of the motor vehicle a change occurs from an electric driving mode with the internal combustion engine shut off, the clutch disengaged and an electric motor in engine operation into a combination driving mode with an internal combustion engine in thrust operation, the clutch engaged and an electric motor in engine operation, or into an internal combustion driving mode with an internal combustion engine in thrust mode, the clutch engaged and an electric motor shifted to a disconnected state, in that the clutch is engaged and the torque of the internal combustion engine is temporarily increased.

BACKGROUND OF THE INVENTION

A parallel-operating hybrid drive train with serial arrangement of components in the aforementioned manner is possible in different embodiments.

Known from DE 103 46 640 A1, for example, is one such hybrid drive train in which the electric motor is arranged coaxially about the input shaft of the driving transmission, the rotor of the electric motor is attached directly to the input shaft of the driving transmission in a non-rotational manner, and the driving transmission is designed as an automatic planetary transmission.

Described in DE 100 12 221 A1 is a hybrid drive train with a primary drive train and a secondary drive train. In the primary drive train which corresponds to the hybrid drive train under consideration herein, the relevant electric motor is arranged axis-parallel to the input shaft of the drive transmission and the rotor of the electric motor is in a drive-connection with the input shaft of the drive transmission by means of an input transmission stage with high translation ratio ($i_{EK}>1$) designed as a pair of spur gears. The drive transmission is designed preferably as an automatic planetary transmission. The discussion below relating to the torque and the rotational speed of the electric motor transmission in this kind of arrangement of the electric motor applies accordingly to the reduced values applied to the output element of the input transmission stage and/or to the input shaft of the drive transmission.

In the above referenced invention the drive transmission is designed preferably as an automatic load-shift transmission, such as an automatic planetary transmission, a double clutch transmission or a stepless transmission. The drive transmission, however, can also be designed as an automatic shift transmission with countershaft design in which shifting processes are associated with an interruption in traction power.

In addition, a start-up element can be provided directly in front of the drive transmission. For example, a hydraulic torque converter can be connected upstream to an automatic transmission in a known manner which is bridged in standard drive mode, that is, outside of start-up and backing processes, by means of an engaged lock-up clutch. A start-up clutch or start-up and shifting clutch designed as dry clutch, in particular as membrane spring clutch or as wet clutch, in particular as laminar clutch which is normally engaged, can be connected upstream to a stepless transmission and to an automatic shifting transmission. The same also applies to a double clutch transmission, which is known to consist of two input shafts each with an associated start up and shifting clutch. Alternatively, a start-up element can also be integrated into the drive transmission, for example, by placement of a start-up clutch associated with the input shaft within the transmission housing of the drive transmission or in that a load-bearing, friction shift element of a drive transmission, designed as automatic transmission, is constructed as a start-up clutch.

This kind of hybrid drive train offers the possibility of operating a motor vehicle, if necessary, in a purely internal combustion drive mode, in a purely electric drive mode, or in a combination drive mode. In the internal combustion drive mode the clutch is engaged, the electric motor is disconnected and the motor vehicle is driven in traction mode solely by means of the drive torque of the internal combustion engine, and in the motor-braking mode—potentially in addition to the braking torque—the motor vehicle is decelerated by additional braking devices, such as an operating brake or a retarder, supported by the drag torque of the internal combustion engine then running in motor-braking mode. In the electric drive mode, the clutch is disengaged, the internal combustion engine is switched off and the motor vehicle is being driven in traction mode solely by the torque of the electric motor operating then as an engine, and in motor-braking mode—perhaps additionally supported by other brake features in addition to the braking torque—the vehicle is decelerated by the drag torque of the electric motor then operating as generator.

In combination drive mode, the clutch is disengaged and the motor vehicle is driven in traction mode by the sum of the drive torques of the internal combustion engine and of the electric motor, and in motor-braking mode—perhaps additionally supported by other brake features in addition to the braking torque—the vehicle is decelerated by the sum of the drag torque of the internal combustion engine and by the electric motor then operating as generator.

In addition to the hybrid drive modes under consideration here, the internal combustion engine and the electric motor can also be operated, if necessary, with a different direction of power flow, so that the generated torques are partly cancelled out. For example, in certain operating phases of traction mode, it may be useful to operate the electric motor as a generator, opposite to the effect of the drive torque of the internal combustion engine, for instance, in order to recharge a drained electric power supply or to operate the internal combustion engine at an optimum operating point. Likewise, in certain operating phases of motor-braking it may be useful to operate the electric motor as an engine, opposite to the effect of the drag torque of the internal combustion engine, for instance, to keep the internal combustion engine above a critical rotational speed limit.

Based on the large number of different operating characteristics of the potential embodiments of this kind of hybrid drive train, known control methods usually are postulated on at least one determination of the power of the electric motor and/or on a particular design of the drive transmission. In addition, the known control methods are often restricted to the solving of partial problems occurring in the control of the particular hybrid drive train.

A method to control a corresponding hybrid drive train is disclosed in DE 43 24 010 C2 which proceeds from a design of the drive transmission as an automatic planetary transmission with a hydraulic torque converter connected immediately upstream. The known method provides that the electric motor be controlled in pure electric drive mode, such that the torque characteristic of an internal combustion engine is simulated. Furthermore, the known method provides that in the motor-braking operation of the relevant motor vehicle the braking moment (drag torque) of the internal combustion engine is supplemented by, or replaced, by a braking torque of the electric motor produced in generator operation.

A similar method to control a corresponding hybrid drive train is described in DE 101 50 990 A1. This known method also proceeds from the design of the drive transmission as an automatic planetary transmission, but no hydraulic torque converter is connected upstream thereto. This method also provides that the electric motor is controlled in a pure electric drive mode, such that the operating behavior of the internal combustion engine is simulated. In a change from electric drive mode (with idling internal combustion engine and disengaged clutch) into combination drive mode or into internal combustion drive mode, the internal combustion engine is started by engaging the clutch, whereby a soft, that is low-jolt, transition to internal combustion engine power is to be ensured. DE 101 50 990 A1 does not, however, indicate how the clutch and the electric motor are actually to be controlled, in order to achieve this result.

An additional method to control a corresponding hybrid drive train is known from DE 102 60 435 A1 which proceeds from an embodiment of the drive transmission as an automatic shift transmission, a double clutch transmission or a stepless transmission, having a second clutch (start-up and shifting clutch or start-up clutch) connected immediately upstream. This method provides that in a change from electric drive mode (with internal combustion engine shut off, disengaged first clutch and engaged second clutch) into combination drive mode, the internal combustion engine is started by engagement of the first clutch, whereby during the starting of the internal combustion engine the power output from the electric motor is increased to avoid a drop of torque on the output side, and the second clutch is partly disengaged to avoid torque fluctuations on the output side or is operated at the slippage limit. No additional data, however, is provided in DE 102 60 435 A1 about the actual control of the first clutch and of the electric motor during starting of the internal combustion engine.

Starting of the internal combustion engine by engaging the clutch located between engine and the electric motor, however, is problematic, since the breakaway torque for cranking of the internal combustion engine and the drag torque (which must be subsequently overcome to accelerate the internal combustion engine up to the rotational speed which allows start-up of the internal combustion engine) are essentially dependent on operating parameters of the internal combustion engine, such as the engine temperature (coolant temperature and oil temperature) and on the maintenance and wear state of the internal combustion engine.

Thus the breakaway torque and the starting drag torque in old internal combustion engines and/or in internal combustion engines in a poor state of maintenance and repair are much higher than for warmed-up internal combustion engines and/or for internal combustion engines in a good state of maintenance and repair. If the start-up process of the internal combustion engine, in particular the wear on the clutch, is performed without taking account of the relevant operating parameters, there necessarily results different starting times for starting of the internal combustion engine and accordingly different control processes for changing from the electric drive mode into the combination drive mode or into the internal combustion drive mode.

SUMMARY OF THE INVENTION

Therefore, the object of this invention is to propose an improved method to control a hybrid drive train of the kind described above in which the change from the electric drive mode into the combination drive mode or into the internal combustion drive mode during traction operation of the motor vehicle is possible in an essentially reproducible manner, regardless of the current operating parameters of the internal combustion engine.

This object is attained in that the engagement of the clutch is regulated at least until a starting rotational speed $n_{Start}$ of the internal combustion engine is reached in such a manner that the acceleration $dn_{VM}/dt$ of the internal combustion engine takes place according to a predetermined progression of rotational speed $n_{VM}(t)$ and that the torque $M_{EM}$ of the internal combustion engine is increased during this time by the same amount as the transferred torque $M_K$ of the clutch is increased by the engagement process ($dM_{EM}/dt=dM_K/dt$, $\Delta M_{EM}=\Delta M_K$).

Accordingly, the method of the invention proceeds from a hybrid drive train of a motor vehicle which is designed as a parallel hybrid drive with a serial arrangement of the internal combustion engine, a clutch, an electric motor operating as an engine and generator, and a drive transmission having an output drive connected to the axle input drive of the motor vehicle. When the motor vehicle is in traction mode, a change should occur from an electric drive mode into a combination drive mode or into an internal combustion mode in a generally smooth and thus comfortable and low-wear manner. The electric drive mode is characterized in that the internal combustion engine is shut off, the clutch is disengaged and the electric motor is being operated as an engine. In the combination drive mode, the internal combustion engine is in traction mode, the clutch is engaged and the electric motor is being operated as an engine. In the internal combustion drive mode, the internal combustion engine is in traction operation, the clutch is engaged and the electric motor is disconnected.

With the motor vehicle in traction mode, a change from the electric drive mode into combination drive mode or into internal combustion drive mode, like that known from DE 102 60 435 A1, takes place, in that the internal combustion engine is started by engaging the clutch and by a temporary increase in the torque $M_{EM}$ of the electric motor.

In order to implement the change from the electric drive mode into the combination drive mode or into the internal combustion drive mode independently of the current operating parameters of the internal combustion engine and in an essentially reproducible manner, the invention provides that engaging the clutch is regulated at least until a starting rotational speed $n_{Start}$ of the internal combustion engine is reached, so that an acceleration $dn_{VM}/dt$ of the internal combustion engine is adjusted which corresponds to a predetermined progression of rotational speed $n_{VM}(t)$. In order to thus avoid a drop of torque on the input shaft of the drive transmission and to achieve essentially steady torque progression during this action, the torque $M_{EM}$ of the electric motor is increased by the amount that the transmissible torque $M_K$ on the clutch is increased by the engagement process ($dM_{EM}/dt=dM_K/dt$, $\Delta M_{EM}=\Delta M_K$). Accordingly, in this phase the transferable torque $M_K$ forms the control value which is tracked by the torque $M_{EM}$ produced by the electric motor.

As a result of the fact that the internal combustion engine is always accelerated and started in the same amount of time independent of the current operating parameters which, like the engine temperature $T_{VM}$ and the current state of maintenance and repair of the internal combustion engine, basically influence the breakaway torque for cranking of the internal combustion engine and the drag torque for subsequent acceleration of the internal combustion engine up to the starting rotational velocity $n_{Start}$, the corresponding changes of the hybrid drive mode always occur essentially in the same way. This simplifies the control of additional functions of the hybrid drive train and provides passengers within the vehicle with an improved sensation of comfort.

The predetermined progression of rotational speed $n_{VM}(t)$ of the internal combustion engine is defined preferably as a ramp-like increase in rotational speed with a constant rotational speed gradient $dn_{VM}/dt=C$, so that a relatively simple control of the clutch actuator is possible by means of an associated clutch characteristic line and the controlled electric motor dependent thereon.

In order to achieve the lowest possible jolt-profile of torque during the continued shifting to the hybrid drive mode, the invention further provides that after the start of the internal combustion engine, roughly during the same time as the internal combustion engine is accelerated to the rotational speed $n_{EM}$ of the electric motor, the clutch is further engaged and the increase in torque $M_{EM}$ of the electric motor caused by the engine start is decreased again.

The invention also provides that after the reduction in the increase in torque $M_{EM}$ of the electric motor caused by engine start, the torque $M_{VM}$ of the internal combustion engine is increased to its target value and the torque $M_{EM}$ of the electric motor is decreased in a coordinated manner to its particular target value.

An essentially steady torque transition is achieved, preferably in that the torque $M_{EM}$ of the electric motor is reduced as a function of the torque $M_{VM}$ of the internal combustion engine to the same amount as the torque $M_{VM}$ of the internal combustion engine is increased ($dM_{EM}/dt=-dM_{VM}/dt$, $\Delta M_{EM}=-\Delta M_{VM}$). Consequently, in this phase the torque $M_{VM}$ of the internal combustion engine forms the control value, which is inversely tracked by the torque $M_{EM}$ produced by the electric motor.

In addition it is advantageous to reduce the control effort, that a control parameter of an associated clutch actuator determining the initial torque gradient $(dM_K/dt)_a$ of the clutch during engagement of the clutch caused by engine start is corrected with each change in the hybrid driving mode as a function of at least one relevant and currently determined operating parameter of the internal combustion engine. The result, then, is that the clutch is engaged by the base controller of the clutch actuator which was used, such that the predetermined progression of rotational speed $n_{VM}(t)$ or the predetermined gradient of rotational speed $dn_{VM}/dt$ is essentially maintained and that very little subsequent regulation is needed.

In this regard, it appears to be particularly useful that a relevant engine temperature $T_{VM}$ of the internal combustion engine is detected by sensors and that the control parameter of the clutch actuator in the presence of an engine temperature $(T_{VM}>T_{Ref})$ greater than a reference temperature $T_{Ref}$ is corrected in the sense of a lower engagement gradient $(dM_K/dt)_a$ and in the presence of an insufficient engine temperature $(T_{VM}<T_{Ref})$, the reference temperature $T_{Ref}$ is corrected in the sense of a higher engagement gradient $(dM_K/dt)_a$.

Likewise, in this regard the shut-down period $\Delta t_{Abst}$ can be detected, since the last shut-down of the internal combustion engine and the control parameter of the clutch actuator can be corrected in the presence of a shut-down period $(\Delta t_{Abst}>\Delta t_{Ref})$ greater than a reference time $\Delta t_{Ref}$ in the sense of a higher engagement gradient $(dM_K/dt)_a$, and in the presence of a shut-down period $(\Delta t_{Abst}<\Delta t_{Ref})$ less than a reference time $\Delta t_{Ref}$, in the sense of a lower engagement gradient $(dM_K/dt)_a$.

One particularly advantageous adaptation method to reduce the control effort consists of a control parameter of an associated clutch actuator which determines the intermediate torque gradient $(dM_K/dt)_m$ of the clutch during the engagement of the clutch caused by engine start, that is determined with each change into the hybrid driving mode and of a deviation from the previously valid control parameter for control of the initial torque gradient $(dM_K/dt)_a$ of the clutch which is adapted to the currently determined control parameter.

The adaptation of the formerly valid control parameter can comprise, in a known manner, the correction of the formerly valid control parameter in the direction of the currently determined control parameter or the replacement of the formerly valid control parameter by the currently determined control parameter and also the saving of the control parameter determined in this manner instead of the formerly valid control parameter. Preferably longer-term and irreversibly changed operating parameters of the internal combustion engine, such as the wear state of the internal combustion engine, are implicitly detected and automatically compensated with this procedure.

Without additional measures, even short-time variable operating parameters such as the engine temperature $T_{VM}$ and the maintenance state of the internal combustion engine are detected and compensated frequently and partly offset with respect to each other. This, however, can be avoided in that the control parameter of the associated clutch actuator which determines the intermediate torque gradient $(dM_K/dt)_m$ of the clutch is ascertained in connection with at least one current, short-term variable operating parameter, and that the relevant previously valid control parameter is determined as a function of the at least one operating parameter for control of the initial torque gradient $(dM_K/dt)_a$ of the clutch from a plurality of control parameters parameterized accordingly and is subsequently adapted.

The determination of the formerly applicable control parameter can take place, for example, when using the current engine temperature $T_{VM}$ as a short-term variable operating parameter, in that the current engine temperature $T_{VM}$ is sensed, and that then the control parameter linked with the nearest engine temperature $T_{VM}$ is chosen as the formerly valid control parameter from the plurality of control parameters having the operating temperature $T_{VM}$ as a parameter or the formerly valid control parameter is determined by interpolation from the control parameters linked with the nearest engine temperatures $T_{VM}$. Any potentially necessary adaptation of this control parameter for the control of future changes of the hybrid drive mode is then restricted in a favorable manner to other operating parameters, not including the operating parameters involved here (for example, the engine temperature $T_{VM}$).

The change to hybrid drive mode is initiated when a limit torque $M_{EM\_Gr}$ is reached or exceeded by the current torque $M_{EM}$ of the electric motor. The reason for this can be an increasing power demand by the driver or a load state of the electric power supply to the electric motor which is falling below a critical level. The level of the limiting torque $M_{EM\_Gr}$ is variable and is obtained by subtraction of a start up torque $\Delta M_{EM\_Start}$ and a control reserve $\Delta M_{EM\_Res}$ from a maximum torque $M_{EM\_max}$, which is also variable and is basically determined by the current load state of the electric power supply ($M_{EM\_Gr}=M_{EM\_max}-\Delta M_{EM\_Start}-\Delta M_{EM\_Res}$).

The control reserve $\Delta M_{EM\_Res}$ is a safety reserve and is used to prevent a low discharge of the electric power supply.

The start-up torque $\Delta M_{EM\_Start}$ is reserved for compensation of the increasing clutch torque $M_K$, when starting the internal combustion engine VM, and thus in principle is determined by the breakaway torque and the drag torque of the internal combustion engine VM. Since the current operating state of the internal combustion engine VM is not inherently known very accurately, a start-up torque $\Delta M_{EM\_Start}$ was reserved up to now for the worst case, that is, for the largest possible breakaway torque and drag torque of the internal combustion engine. This, however, has the disadvantageous result that the capacitance of the electric power supply is not used to the optimum and thus the limiting torque $\Delta M_{EM\_GR}$ is usually set too low, and thus the change into combination drive mode or into internal combustion drive mode occurs too early.

To avoid this disadvantage, the invention provides that a torque $M_{EM\_Gr}$ of the electric motor causing the change of the hybrid driving mode is determined as a function of at least one relevant and currently detected operating parameter of the internal combustion engine.

For this, a relevant engine temperature $T_{VM}$ of the internal combustion engine, such as the oil temperature or the coolant water temperature, is detected by sensors and the torque $M_{EM\_Gr}$ of the electric motor is increased in the presence of an engine temperature ($T_{VM}>T_{Ref}$) above a reference temperature $T_{Ref}$ and is reduced in the presence of an engine temperature ($T_{VM}<T_{Ref}$) below the reference temperature $T_{Ref}$.

Likewise in this regard, it is possible to detect the shut-down period $\Delta t_{Abst}$ since the last shut-down of the internal combustion engine, and then the torque $M_{EM\_Gr}$ of the electric motor is reduced in the presence of a shut-down period ($\Delta t_{Abst}>\Delta t_{Ref}$) greater than a reference time $\Delta t_{Ref}$ and is increased in the presence of a shut-down period ($\Delta t_{Abst}<\Delta t_{Ref}$) less than a reference time $\Delta t_{Ref}$.

The hybrid drive train from DE 102 60 435 A1 with a second clutch (start up and shifting clutch) connected directly upstream to the drive transmission which uses a known method for damping of occurring torque peaks by partly disengaging the second clutch during the change to the hybrid drive mode or of operating at the slippage limit can also be transferred to differently designed hybrid drive trains.

Accordingly, in an embodiment of the drive transmission as a double clutch transmission equipped with two shift clutches the invention envisions that the load-bearing shift clutch is kept disengaged up to the slippage limit for damping of torque peaks during the change of the hybrid driving mode. This means that the relevant shift clutch is disengaged at the beginning of the method up to the slippage limit, is held at the slippage limit during the process, and is then fully engaged again at the end of the process. The damping of occurring torque peaks is achieved in that the function of the relevant shift clutch changes briefly into that of an anti-slip clutch during slipping operation and thus smoothes out or filters out the positive torque peaks.

In one embodiment of the drive transmission as an automatic planetary transmission equipped with friction shift elements, the damping of the torque can be attained in that at least one of the load-bearing friction shift elements is kept disengaged up to the slippage limit for damping of torque peaks during the change to the hybrid driving mode.

In the presence of a hydraulic torque converter arranged directly in front of the driving transmission and equipped with a lock-up clutch, however, the damping of the torque peaks can be attained in that the lock-up clutch is kept fully disengaged for damping of torque peaks during the change to the hybrid driving mode. This means that the lock-up clutch is fully disengaged at the beginning of the process, is kept disengaged during the process, and is then fully engaged again at the end of the process. The damping of occurring torque peaks in this case is brought about by the elastic, damping transmission properties of the torque converter.

Now if a gear shift is intended in the time proximity to the change of the hybrid driving mode, then this gear shift process should be carried out simultaneously with the change to the hybrid driving mode, since the torque peaks caused by the shift and the torque peaks caused by the change to hybrid drive mode can be partly eliminated or at least will be perceived by vehicle passengers as a single, comfort-reducing load jolt.

BRIEF DESCRIPTION OF THE DRAWINGS

To illustrate the invention, figures with design embodiments are attached to the description. These figures show.

DETAILED DESCRIPTION OF THE PREFERRED EMBODIMENTS

Figure 1:
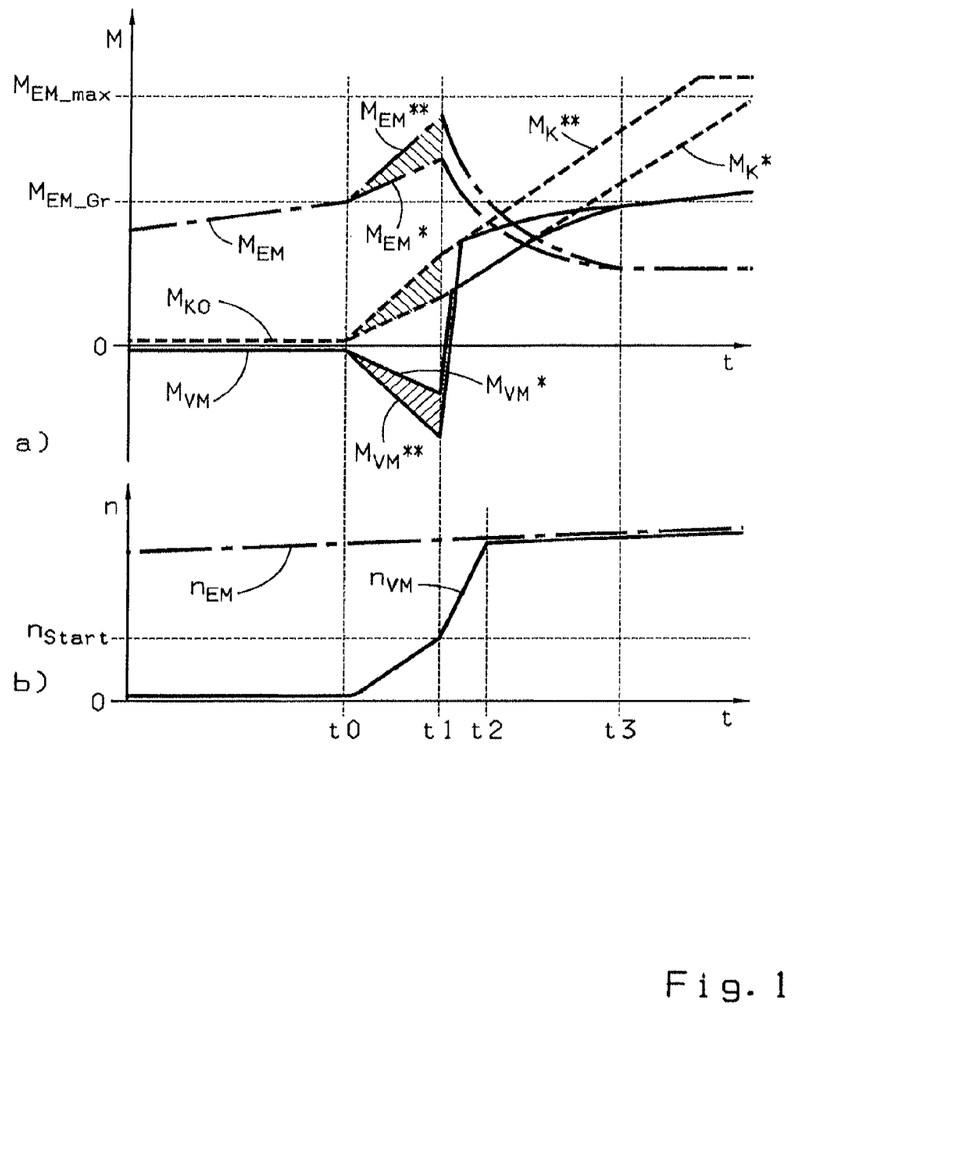
FIG. 1 A shifting sequence according to the invention from the electric drive mode into combination drive mode for a hybrid drive train in traction mode of the motor vehicle in the form of the relevant torque- and rotational speed profiles.
Figure 2:
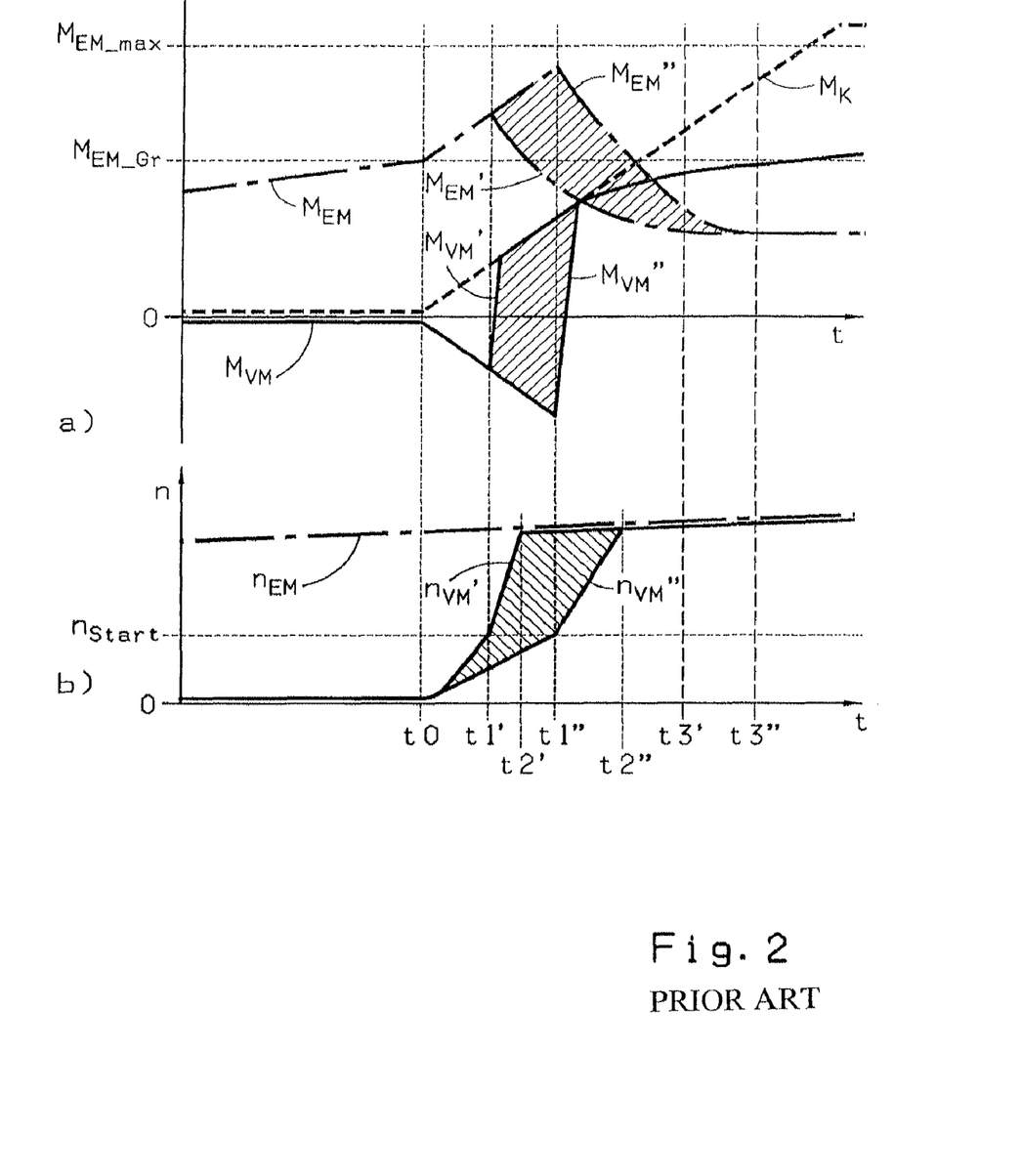
FIG. 2 A known sequence of shifting from the electric drive mode into the combination drive mode of a hybrid drive train in traction mode of the motor vehicle in the form of the relevant torque- and rotational speed profiles.

In the two diagrams of FIGS. 1 and 2 two different processes are illustrated, based on relevant torque- and rotational speed profiles, which each relate to a hybrid drive train of a motor vehicle that is designed as a parallel hybrid with a serial arrangement of an internal combustion engine VM, a clutch K, an electric motor EM operable as an engine and a generator, and a drive transmission having a drive connection on the output side to a drive axle of the motor vehicle.

Based on the torque profiles of the internal combustion engine, of the electric motor and of the transmissible torque to the clutch, $M_{VM}(t)$, $M_{EM}(t)$, $M_K(t)$, illustrated in part a), and also based on the profiles of rotational speed $n_{VM}(t)$, $n_{EM}(t)$ of the internal combustion engine and of the electric motor illustrated in part b) of the figures, it is clear how in the traction mode of the motor vehicle a change from an electric drive mode, in which the internal combustion engine is shut off, the clutch is disengaged and the electric motor is operating as engine, into a combination drive mode will occur, in which the internal combustion engine is in traction mode, the clutch is engaged and the electric motor is operating at reduced torque as an engine.

In the generally well-known process according to FIG. 2, the torque $M_{EM}$ of the electric motor at time t0 reaches a limiting torque $M_{EM\_Gr}$, so that the change is triggered from the electric drive mode into the combination drive mode. The limiting torque $M_{EM\_Gr}$ has fallen so much in comparison to a maximum torque $M_{EM\_max}$ determined essentially by the current load state of an associated electric power supply, that the maximum torque $M_{EM\_max}$ is neither reached nor exceeded during the following control process.

The internal combustion engine is first accelerated during the initiation of the change to hybrid drive mode by engaging the clutch and a simultaneous increase in the torque $M_{EM}$ of the electric motor, until the start-up rotational speed $n_{Start}$ necessary to start the internal combustion engine is reached. Since this occurs independently of the current operating state of the internal combustion engine, however, that is, independent of the current breakaway torque for cranking and of the drag torque for subsequent acceleration of the internal combustion engine, always with the same control sequences for engaging of the clutch and for increasing the torque $M_{EM}$ of the electric motor, different torque profiles $n_{VM}(t)$ unavoidably occur, especially during the acceleration of the internal combustion engine.

Thus in FIG. 2, part-figure b), $n_{VM}'(t)$ denotes a relatively steep progression of rotational speed which is adjusted for extremely low breakaway torque and drag torque of the internal combustion engine that exist in an operationally warm internal combustion engine with a good maintenance and repair status. On the other hand, $n_{VM}''(t)$ illustrates a relatively flat progression of rotational speed which is adjusted for extremely high breakaway torque and drag torque of the internal combustion engine that exist in an operationally cold internal combustion engine with a poor maintenance and repair status. The bandwidth of possible progressions of rotational speed $n_{VM}(t)$ is illustrated in FIG. 2, sub-figure b) by the shaded region between these two limiting progressions $n_{VM}'(t)$ and $n_{VM}''(t)$.

Once the start-up rotational speed $n_{Start}$ is reached at time t1' or t1'', the internal combustion engine is then started by internal combustion, passes over from motor-braking into traction mode, and then as its torque $M_{VM}'$ or $M_{VM}''$ increases, is accelerated to the rotational speed $n_{EM}$ of the electric motor which is reached at time t2' or t2''.

At the same time, the clutch is again engaged and the increase in torque $M_{EM}'$ or $M_{EM}''$ of the electric motor decreases again. Next, the torque $M_{VM}$ of the internal combustion engine increases to its target value and the torque $M_{EM}$ of the electric motor is reduced to its target value.

In the case of an extremely low breakaway- and drag torque of the internal combustion engine (see profiles of rotational speed and torque $n_{VM}'$, $M_{VM}'$, $M_{EM}'$) the change to hybrid drive mode occurs relatively quickly and is concluded right at time t3'. In the case of an extremely high breakaway- and drag torque of the internal combustion engine (see profiles of rotational speed and torque $n_{VM}''$, $M_{VM}''$, $M_{EM}''$), the change to hybrid drive mode is relatively slow and is not concluded until later at time t3''. The bandwidth of possible progressions of torque, is illustrated in FIG. 2 by the shaded region between these two limiting progressions $M_{VM}'(t)$ and $M_{VM}''(t)$, and/or $M_{EM}'(t)$ and $M_{EM}''(t)$.

Depending on the current operating state of the internal combustion engine, starting times of varying length therefore result for starting of the internal combustion engine and accordingly different control processes for changing from electric drive mode to combination drive mode, so that the control of additional functions of the hybrid drive train is impeded and a negative comfort sensation will be perceived by the vehicle passengers.

Conversely, in the inventive process sequence according to FIG. 1, a reproducible, that is, always essentially identical control sequence is achieved, regardless of the current operating state of the internal combustion engine.

In order to attain this advantage, the invention provides, that engagement of the clutch starting at time t0 is controlled, at least until reaching the starting rotational speed $n_{Start}$ of the internal combustion engine, in such a manner that the acceleration $dn_{VM}/dt$ of the internal combustion engine occurs according to the predetermined profile of rotational speed $n_{VM}(t)$ which in the present case is defined as a ramp-like increase in rotational speed with a constant gradient of rotational speed ($dn_{VM}/dt=C$) (see FIG. 1, sub-figure b). During the acceleration of the internal combustion engine to its starting rotational speed $n_{Start}$, which is reached at time t1, the torque $M_{EM}$ of the electric motor is increased to the same extent as the transmissible torque $M_K$ on the clutch is increased by the engagement process ($dM_{EM}/dt=dM_K/dt$, $\Delta M_{EM}=\Delta M_K$). The transmissible torque $M_K$ on the clutch in this phase thus forms the control value which is tracked by the torque $M_{EM}$ generated by the electric motor.

Since the maintenance of the predetermined profile of rotational speed $n_{VM}(t)$ requires different torque gradients $dM_K/dt$, $dM_{EM}/dt$ on the clutch and on the electric motor, depending on the current operating state, i.e., on the level of the current breakaway- and drag torque on the internal combustion engine, there necessarily result different torque progressions $M_K(t)$, $M_{EM}(t)$, $M_{VM}(t)$.

In the case of an extremely low breakaway- and drag torque on the internal combustion engine at the given acceleration of the internal combustion engine, a relatively low torque gradient $dM_K/dt$ results at the clutch. The resulting torque progressions on the clutch, on the electric motor and on the internal combustion engine are denoted in FIG. 1, sub-figure a), as $M_K^*$, $M_{EM}^*$, and $M_{VM}^*$.

In the case of an extremely high breakaway- and drag torque on the internal combustion engine at the indicated acceleration of the internal combustion engine, a relatively high torque gradient $d_MK/dt$ occurs at the clutch. The resulting torque progressions on the clutch, on the electric motor and on the internal combustion engine are denoted in FIG. 1 as $M_K^{}$, $M_{EM}^{}$ and $M_{VM}^{**}$. The bandwidth of possible torque progressions for the time t0 to t1 is illustrated in FIG. 1 by the shaded region between these two limiting progressions $M_K^*(t)$ and $M_K^{**}(t)$, $M_{EM}^*(t)$ and $M_{EM}^{**}(t)$, and $M_{VM}^*(t)$ and $M_{VM}^{**}(t)$ (see FIG. 1, sub-figure a).

The internal combustion engine transitions from motor-braking into traction mode at the internal-combustion start. Then, to achieve the most harmonious and low-jolt output torque profile, the internal combustion engine is accelerated at approximately the same time to the rotational speed $n_{EM}$ of the electric motor, which is reached at time t2, the clutch continues to be engaged, and the increase in torque $M_{EM}$ of the electric motor caused by the engine start is again reduced. Next, the torque $M_{VM}$ of the internal combustion engine and the torque $M_{EM}$ of the electric motor are controlled to their particular target values in a coordinated manner, in that the torque $M_{EM}$ of the electric motor is reduced to the same extent as the torque $M_{VM}$ of the internal combustion engine is increased ($dM_{EM}/dt=-dM_{VM}/dt$, $\Delta M_{EM}=-\Delta M_{VM}$). Thus in this phase, the torque $M_{VM}$ of the internal combustion engine forms the control value which is tracked by the torque $M_{EM}$ produced by the electric motor EM.

Once the particular target values of torques $M_{VM}$, $M_{EM}$ are reached at time t3, the change to hybrid drive mode is completed. In spite of the torque profiles $M_K^*(t)$, $M_{EM}^*(t)$, $M_{VM}^*(t)$ and/or $M_K^{}(t)$, $M_{EM}^{}(t)$, $M_{VM}^{**}(t)$ having different level or gradient at time t0 depending on the current operating state of the internal combustion engine, basically identical time profiles of the control processes are obtained, so that a reproducible change from the electric drive mode into the combination drive mode is achieved.

Figure 3:
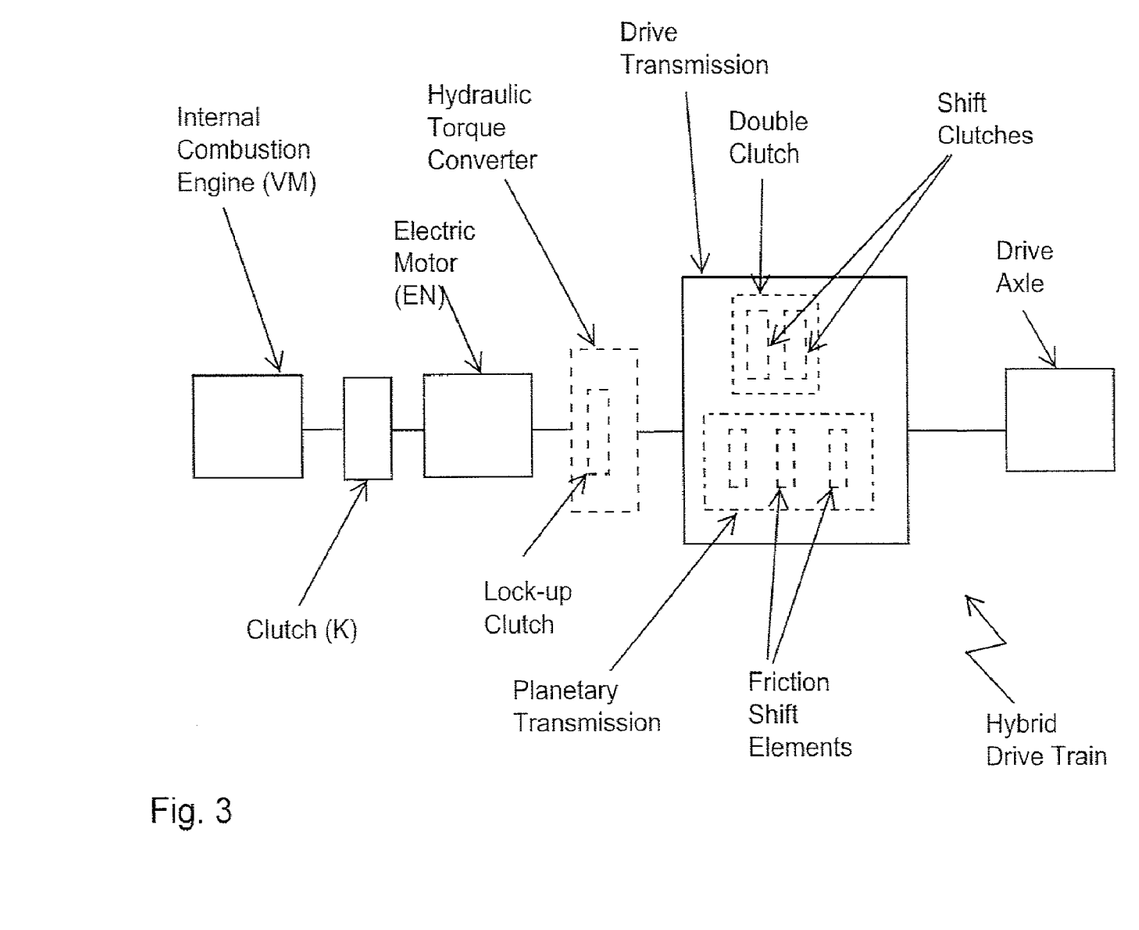
FIG. 3 is a diagrammatic drawing which shows the various components for accomplishing the present invention.

FIG. 3 is a diagrammatic drawing which shows the various components for accomplishing the inventive aspects of the present invention which are disclosed above.

Reference Characters
C Constant
EM Electric motor
$i_{EK}$ Translation of the electric motor
K Clutch
$M_{EM}$ Torque of the electric motor $M_{EM}'$ Torque of the electric motor
$M_{EM}''$ Torque of the electric motor
$M_{EM}^*$ Torque of the electric motor
$M_{EM}^{**}$ Torque of the electric motor
$M_{EM\_Gr}$ Limiting Torque of the electric motor
$M_{EM-max}$ Maximum torque of the electric motor
$M_K$ Transmissible torque of the clutch, clutch torque
$M_K^*$ Transmissible torque of the clutch, clutch torque
$M_K^{**}$ Transmissible torque of the clutch, clutch torque
$M_{VM}$ Torque of the internal combustion engine, engine torque
$M_{VM}'$ Torque of the internal combustion engine, engine torque
$M_{VM}''$ Torque of the internal combustion engine, engine torque
$M_{VM}^*$ Torque of the internal combustion engine, engine torque
$M_{VM}^{**}$ Torque of the internal combustion engine, engine torque
$n_{EM}$ Rotational speed of the electric motor
$n_{VM}$ Rotational speed of the internal combustion engine
$n_{VM}'$ Rotational speed of the internal combustion engine
$n_{VM}''$ Rotational speed of the internal combustion engine
t0-t3 Time points
t1'-t3' Time points
t1''-t3'' Time points
$T_{Ref}$ Reference temperature
$T_{VM}$ Engine temperature
VM Internal combustion engine
$\Delta M_{EM}$ Change in torque of the electric motor
$\Delta M_{EM\_Res}$ Standard reserve of the electric motor
$\Delta M_{EM\_Start}$ Starting torque of the electric motor to start the internal combustion engine
$\Delta M_K$ Change in torque of the clutch
$\Delta M_{VM}$ Change in torque of the internal combustion engine
t Time
$\Delta t$ Time period
$\Delta t_{Abst}$ Shut-down period
$\Delta f_{Ref}$ Reference time

The invention claimed is:

1. A method of controlling a hybrid drive train of a motor vehicle having a serial arrangement of an internal combustion engine (VM), a clutch (K), an electric motor (EM) operating as an engine and a generator, and a drive transmission having an output drivingly connected to a drive axle of the motor vehicle, the method comprising the steps of:

during a traction operation of the motor vehicle, initiating a change from an electric driving mode, with the internal combustion engine (VM) shut off, the clutch (K) disengaged and the electric motor (EM) in engine operation, to one of a combination driving mode, with the internal combustion engine (VM) in a traction operation, the clutch (K) engaged and the electric motor (EM) in an engine operation, and an internal combustion driving mode, with the internal combustion engine (VM) in a traction mode, the clutch (K) engaged and the electric motor (EM) shifted to a disconnected state,
initiating engagement of the clutch (K)
temporarily increasing the torque of the electric motor (EM)
regulating engagement of the clutch (K), during engagement, at least until a starting rotational speed ($n_{Start}$) of the internal combustion engine (VM) is reached,
moderating acceleration of the internal combustion engine (VM) according to a predetermined progression of rotational speed ($n_{VM}(t)$) via, at least, the regulation of clutch engagement;
increasing a transferable torque ($M_K$) of the clutch (K) through engagement of the clutch (K); and
increasing a torque ($M_{EM}$) of the electric motor (EM) concurrently, by an equal magnitude, and at an equal rate as the transferable torque (MK) of the clutch (K) is increased, such that a derivative of the torque ($M_{EM}$) of the electric motor (EM) with respect to time is equal to a derivative of the transferable torque ($M_K$) of the clutch (K) with respect to time and a change in the torque ($M_{EM}$) of the electric motor (EM) is equal to a change in the transferable torque ($M_K$) of the clutch (K).

2. The method according to claim 1, further comprising the step of defining the predetermined progression of the rotational speed ($n_{VM}(t)$) of the internal combustion engine (VM) as an increase in rotational speed which has a constant rotational speed gradient, where the derivative of internal combustion engine (VM) rotational speed ($n_{VM}(t)$) with respect to time is constant.

3. The method according to claim 1, further comprising the step of after the start of the internal combustion engine (VM), both continuing to engage the clutch (K) and decreasing the torque ($M_{EM}$) of the electric motor (EM) substantially contemporaneously with accelerating the internal combustion engine (VM) to a rotational speed ($n_{EM}$) of the electric motor (EM).

4. The method according to claim 3, further comprising the step of, after a decrease in torque ($M_{EM}$) of the electric motor (EM) caused by starting of the internal combustion engine (VM), one of increasing or decreasing the torque ($M_{VM}$) of the internal combustion engine (VM) and the torque ($M_{EM}$) of the electric motor (EM) in a coordinated manner to attain a target value.

5. The method according to claim 4, further comprising the step of reducing the torque ($M_{EM}$) of the electric motor (EM) by a same amount of the torque ($M_{VM}$) of the internal combustion engine (VM) is increased such that a derivative of the torque ($M_{EM}$) of the electric motor (EM), with respect to time, is equal to a negative of a derivative of the torque ($M_{VM}$) of the internal combustion engine (VM) with respect to time, and a change in the torque ($M_{EM}$) of the electric motor (EM) is equal to a negative of a change in of the torque ($M_{VM}$) of the internal combustion engine (VM).

6. The method according to claim 1, further comprising the steps of:

correcting a control parameter of an associated clutch actuator, with each change in the hybrid driving mode being a function of at least one relevant and currently determined operating parameter of the internal combustion engine (VM), and
determining, via the control parameter, an initial torque engagement rate of the clutch (K) during the engagement of the clutch (K) required by starting of the internal combustion engine (VM).

7. The method according to claim 6, further comprising the steps of:

detecting a relevant engine temperature ($T_{VM}$) of the internal combustion engine (VM) by sensors,
correcting the control parameter of the clutch actuator in the presence of an engine temperature ($T_{VM}$) greater than a reference temperature ($T_{Ref}$) by decreasing the initial torque engagement rate, and
correcting the control parameter of the clutch actuator in the presence of an engine temperature ($T_{VM}$) less than a reference temperature ($T_{Ref}$) by increasing the initial torque engagement rate.

8. The method according to claim 7, further comprising the steps of:

detecting a shut-down period ($\Delta t_{Abst}$) since a last shut-down of the internal combustion engine (VM), correcting the control parameter of the clutch actuator by increasing the initial torque engagement rate if the shut down period ($\Delta t_{Abst}$) is greater than a reference time ($\Delta t_{Ref}$), and correcting the control parameter of the clutch actuator by decreasing the initial torque engagement rate if the shut down period ($\Delta t_{Abst}$) is less than the reference time ($\Delta t_{Ref}$).

9. The method according to claim 1, further comprising the steps of:

determining, with each change in the hybrid driving mode, a current control parameter of an associated clutch actuator, which determines an intermediate torque engagement rate of the clutch (K) during the engagement of the clutch (K) required by engine start, and adapting a previously valid control parameter to the currently determined control parameter if the current control parameter deviates from the previously valid control parameter for control of an initial torque engagement rate of the clutch (K).

10. The method according to claim 9, further comprising the steps of:

ascertaining, in connection with at least one current, short-term variable operating parameter, the control parameter of the associated clutch actuator which determines the intermediate torque engagement rate: of the clutch (K), and determining a relevant, previously valid control parameter as a function of the at least one operating parameter for control of the initial torque engagement rate of the clutch (K) from a plurality of control parameters parameterized accordingly and subsequently adapting the previously valid control parameter.

11. The method according to claim 1, further comprising the step of determining a torque ($M_{EM\_Gr}$) of the electric motor (EM) causing a change of the hybrid driving mode as a function of at least one relevant and currently detected operating parameter of the internal combustion engine (VM).

12. The method according to claim 11, further comprising the steps of:

detecting, with at least one sensor, a relevant engine temperature ($T_{VM}$) of the internal combustion engine (VM), increasing the torque ($M_{EM\_Gr}$) of the electric motor (EM) if the engine temperature ($T_{VM}$) is above a reference temperature ($T_{Ref}$), and reducing the torque ($M_{EM\_Gr}$) of the electric motor (EM), if the engine temperature ($T_{VM}$) is below the reference temperature ($T_{Ref}$).

13. The method according to claim 11, further comprising the steps of:

detecting a shut-down period ($\Delta t_{Abst}$) since a prior shut-down of the internal combustion engine (VM), reducing the torque ($M_{EM\_Gr}$) of the electric motor (EM) if the shut-down period ($\Delta t_{Abst}$) is greater than a reference time ($\Delta t_{Ref}$); and increasing the torque ($M_{EM\_Gr}$) of the electric motor (EM) if the shut-down period ($\Delta t_{Abst}$) is less than a reference time ($\Delta t_{Ref}$).

14. The method according to claim 1, wherein the driving transmission is a double clutch transmission equipped with two shift clutches and the method further comprising the step of maintaining a disengagement of a load-bearing shift clutch up to a slippage limit for damping torque peaks during a change of the hybrid driving mode.

15. The method according to claim 1, wherein the driving transmission is an automatic planetary transmission with friction shift elements and the method further comprising the step of maintaining a disengagement of at least one load-bearing friction shift element up to a slippage limit for damping torque peaks during a change of the hybrid driving mode.

16. The method according to claim 1, wherein a hydraulic torque converter, equipped with a lock-up clutch, is arranged directly upstream of the driving transmission and the method further comprising the step of maintaining disengagement of the lock-up clutch, for damping torque peaks, during a change of the hybrid driving mode.

17. The method according to claim 1, further comprising the step of carrying out a gear shifting process in coordination with and substantially concurrently with when a hybrid driving mode changes.

18. A method of controlling a hybrid drive train of a motor vehicle during traction operation of the vehicle to change from an exclusively electrically driving mode to either an exclusively internal combustion driving mode or a combined driving mode, the drive train comprising, in series, an internal combustion engine (VM), a clutch (K), an electric motor (EM), which is operable as an engine and a generator, and a drive transmission having an output drivingly coupled to a drive axle, the method comprising the steps of:

shutting off the internal combustion engine (VM), disengaging the clutch (K), and operating the electric motor (EM) as an engine when the drive train is in the exclusively electrically driving mode;

operating the internal combustion engine (VM) in a traction state, engaging the clutch (K) and operating the electric motor (EM) in a disconnected state when the drive train is in the exclusively internal combustion driving mode; and operating the internal combustion engine (VM) in a traction state, engaging the clutch (K) and operating the electric motor (EM) as an engine when the drive train is in the combined driving mode;

regulating engagement of the clutch (K), at least until the internal combustion engine (VM) reaches a starting rotational speed ($n_{Start}$), such that acceleration of the internal combustion engine (VM) takes place according to a predetermined progression of rotational speed ($n_{VM}(t)$); and simultaneously, during engagement of the clutch, increasing torque ($M_{EM}$) of the electric motor (EM) and transferable torque (MK) of the clutch (K) by a same amount and at a same rate such that a derivative of the torque ($M_{EM}$) of the electric motor (EM), with respect to time, is equal to a derivative of the transferable torque ($M_K$) of the clutch (K), with respect to time, and a change in the torque ($M_{EM}$) of the electric motor (EM) is equal to a change in the transferable torque ($M_K$) of the clutch (K).

* * * * *